US00H002110H1

(19) United States
(12) Statutory Invention Registration
Newman

(10) Reg. No.: US H2110 H
(43) Published: Oct. 5, 2004

(54) AUTOMATED SECURITY SCANNING PROCESS

(75) Inventor: George H. Newman, Niceville, FL (US)

(73) Assignee: The United States of America as represented by the Secretary of the Air Force, Washington, DC (US)

(21) Appl. No.: 10/207,955

(22) Filed: Jul. 30, 2002

(51) Int. Cl.[7] ..... G08B 13/14

(52) U.S. Cl. ..... 340/572.4

(58) Field of Search ..... 340/572.4, 568.1; 378/57

(56) References Cited

U.S. PATENT DOCUMENTS 5,410,156 A * 4/1995 Miller ..... 250/390.04
5,600,303 A * 2/1997 Husseiny et al. ..... 340/568.1

* cited by examiner

*Primary Examiner*—Daniel T. Pihulic
(74) *Attorney, Agent, or Firm*—William G. Auton

(57) ABSTRACT

This invention automates a portion of the existing process by applying computerized comparative assessment program to the image presented on the operator's viewing screen. This is accomplished by creating a computerized image database of all known weapons, dangerous articles, and other prohibited items. At the same time the scanned container's contents data is converted to the image presented on the operator's viewing screen, the same data is computer compared to the weapons database. Just as the human mentally compares learned weapons database against what he or she sees on the monitor, the computer accomplishes the same process, except much more timely and accurately. When the computer identifies data from the scanned image that correlates to it's prohibited items database, it alerts the security operator by any number of common means and highlights the image on the security operator's monitor.

2 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AUTOMATED SECURITY SCANNING PROCESS

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to terrorist threat detection systems and more specifically to an airport automated security scanning process. The horror of the World Trade Center devastation and the attack on the Pentagon teaches us that automated security scanning in airports and other locations is a serious endeavor that needs priority. Requirement and process currently exists to inspect the inside of carry-on bags, luggage, and other containers to determine if weapons, dangerous articles, and other prohibited items are hidden within. This is generally accomplished by passing a container through and x-ray scanning machine while a security operator observes the container's contents on a monitor screen (such as the process generally observed at an airport security checkpoint). This is an effective process if/and only if the operator is fully trained, experienced, has the time needed to properly evaluate what he/she sees on the monitor, and last, but not least, fully applies his/her full attention to the assessment. Unfortunately, the assessment process is boring-tedious work and as a result, the operator can/does become complacent. When this occurs, prohibited items pass through the security screening process undetected. Today's victims are not just the passengers on the airplanes, and a federal takeover of airport security may be imminent.

Recent developments in airport security systems are disclosed in the following U.S. patents, the disclosures of which are incorporated herein by reference: U.S. Pat. No. 6,218,943 issued to Ellenbogen;

U.S. Pat. No. 5,642,393 issued to Krug et al;

U.S. Pat. No. 5,692,029 issued to Husseiny et al;

U.S. Pat. No. 5,699,400 issued to Lee et al;

U.S. Pat. No. 5,784,430 issued to Sredniawski;

U.S. Pat. No. 5,974,111 issued to Krug et al;

U.S. Pat. No. 6,018,562 issued to Willson.

The above-cited patents describe baggage and security detection systems. Exemplary is the Ellenbogen reference which describes a contraband detection and article reclaim system that includes at least one article inspection system configured to derive inspection data from an article and compare the inspection data to target object data to detect contraband, and to assign matching information to each article in which contraband was detected that matches the article to its inspection data. The at least one article inspection system is connected to a server and the inspection data and the matching information are transferred to the server. An article tagging system is configured to generate a tag for each article in which contraband was detected. The tag includes the matching information about the article and at least one workstation coupled to said server and configured to permit entry of the matching information so that the inspection data of an article in which contraband was detected can be transferred to the workstation and to display the inspection data.

SUMMARY OF THE INVENTION

This invention automates a portion of the existing process by applying computerized comparative assessment program to the image presented on the operator's viewing screen. This is accomplished by creating a computerized image database of all known weapons and dangerous items. At the same time the scanned container's contents data is converted to the image presented on the operator's viewing screen, the same data is computer compared to the weapons database. Just as the human mentally compares learned weapons database against what he or she sees on the monitor, the computer accomplishes the same process, except much more timely and accurately. When the computer identifies data from the scanned image that correlates to it's prohibited items database, it alerts the security operator by any number of common means and highlights the image on the security operator's monitor.

The invention/process allows more containers, baggage, etc. to be security scanned and assessed in a given amount of time. The invention/process augments the human operator in a manner that increases human operator ability to identify weapons and/or dangerous items during the security scan that he or she could normally miss without computerized augmentation. The invention/process does not get tired or bored with the tedious process it accomplishes, so the effects of human complacency and loss of attention to detail are greatly reduced. The invention/process can be used "stand-alone" without human oversight to security scan containers, baggage, and cargo, etc. when and where security is not the highest priority.

With advent of low cost-high powered computers with extensive data storage capacity, there is no human alternative that can prove as efficient and effective in accurately comparing scanned images to it's prohibited items database.

DETAILED DESCRIPTION OF THE PREFERRED EMBODIMENT

This invention automates a portion of the existing process by applying a computerized comparative assessment program to the image presented on the operator's viewing screen. This is accomplished by creating a computerized image database of all known weapons, dangerous articles, and other prohibited items. At the same time the scanned container's contents data is converted to the image presented on the operator's viewing screen, the same data is computer compared to the weapons database. Just as the human mentally compares learned weapons database against what he or she sees on the monitor, the computer accomplishes the same process, except much more timely and accurately. When the computer identifies data from the scanned image that correlates to it's prohibited items database, it alerts the security operator by any number of common means and highlights the image on the security operator's monitor.

Figure 1:
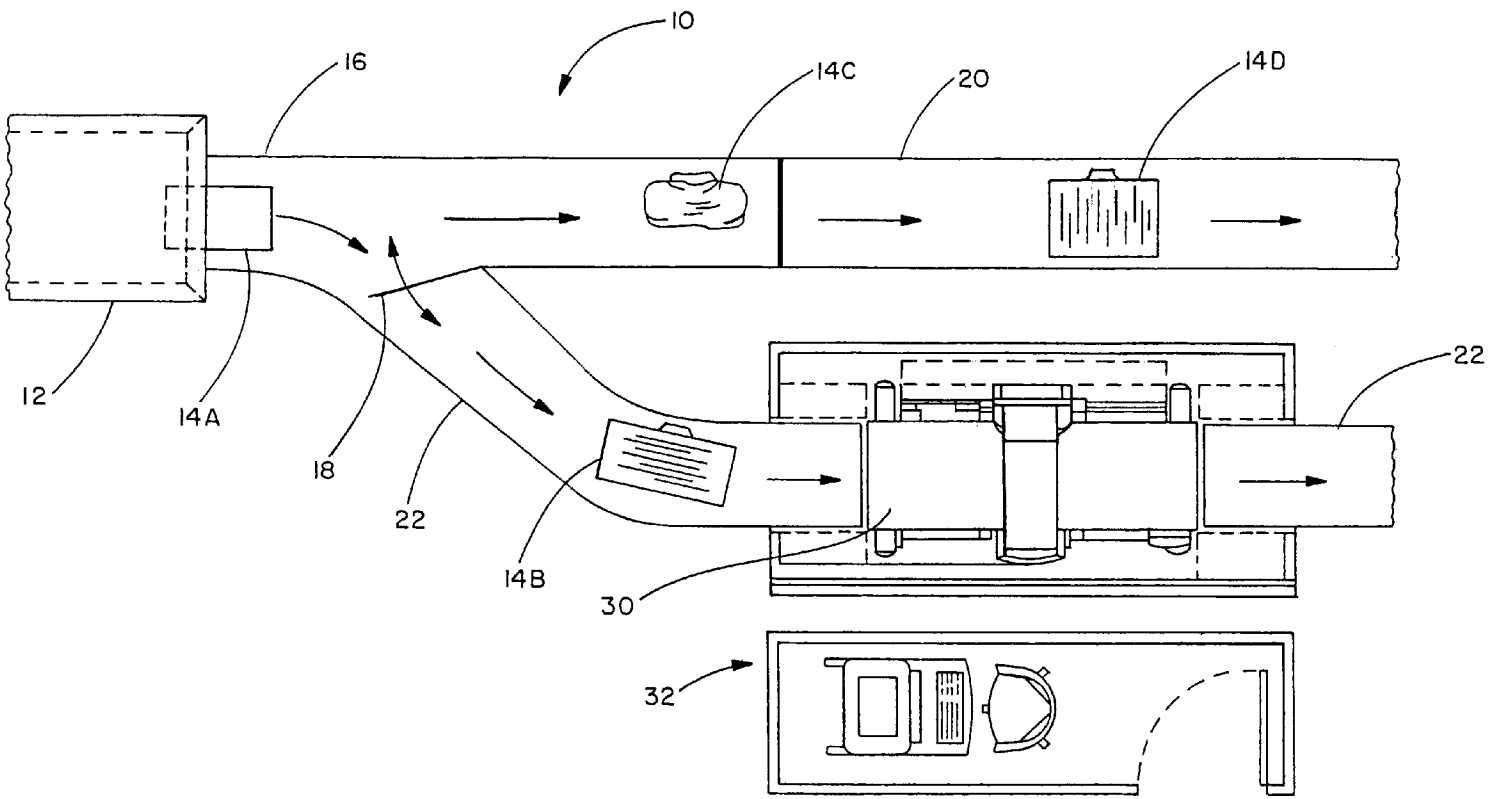
FIG. 1 PRIOR ART
FIG. 1 is an illustration of a prior art x-ray luggage inspection system.

FIG. 1 is an illustration of the prior art x-ray luggage inspection system. Referring to FIG. 1 and x-ray inspection system 10 includes a level one x-ray inspection device 12, such as VIVID Rapid Detection System (available from Vivid Technologies, Inc., Waltham, Mass., which examines items of baggage being transported on a conveyor 16. When device 12 examines an item of baggage 14A and evaluates the item as free of regions that could contain contraband, the item is automatically directed by a baggage pusher 18 to proceed further on conveyor 20. If device 12 detects possible presence of contraband, pusher 18 directs baggage 14B to conveyor 22 that transports the baggage to an x-ray inspection device 30, such as a modified version of a QDR 4500 scanner (available from Hologic, Inc., Waltham, Mass.). An operator located at a remote location 32 can oversee the entire inspection process, evaluate data detected and processed by inspection device 12 and direct operation of inspection device 30.

Figure 2:
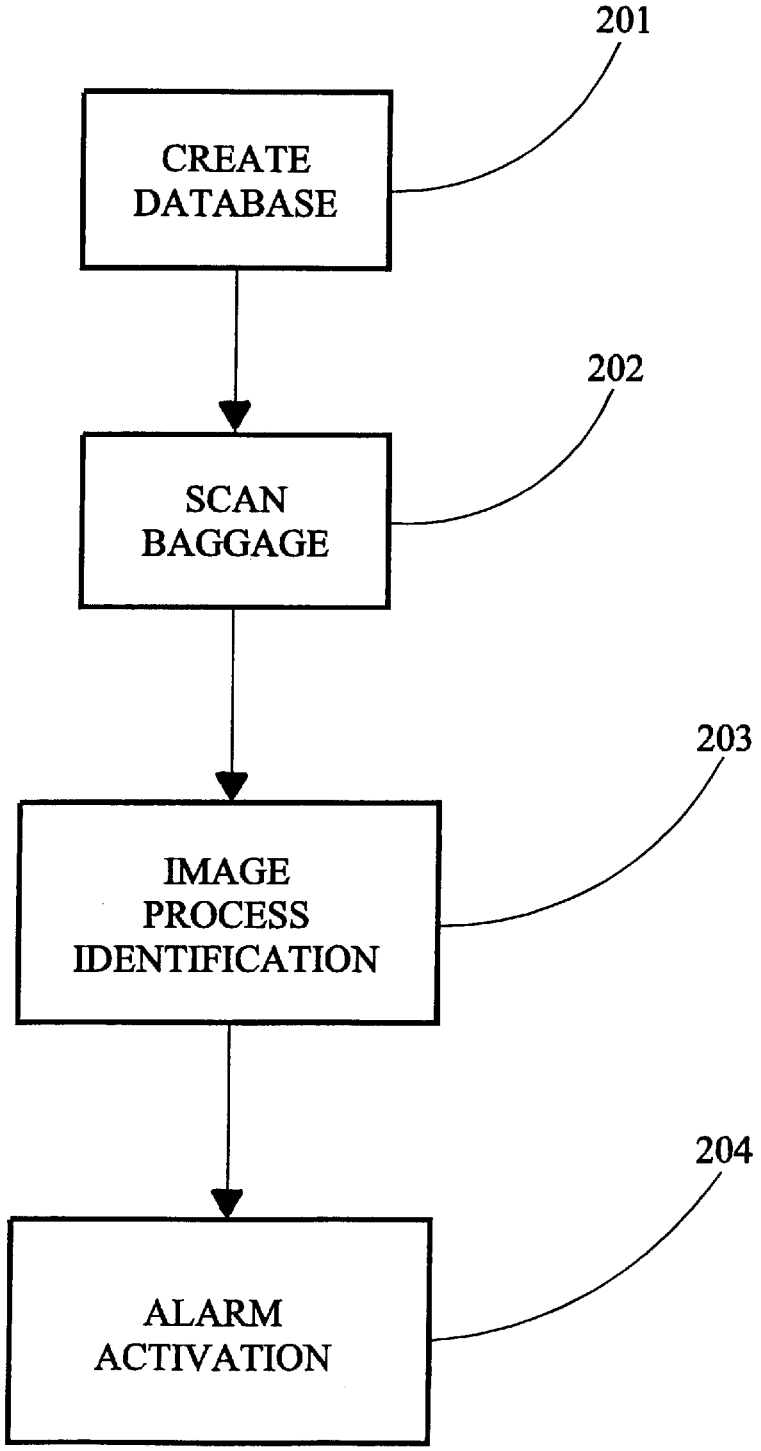
FIG. 2 is a block diagram of the process of the present invention.

Referring to FIG. 2, the process of the present invention can augment and automate the contraband inspection system of FIG. 1 using image identification technology. The process of FIG. 2 begins by creating a computerized image database of all known weapons and other prohibited items 201. Suitable computerized image technology is described in the following U.S. patents, the disclosures of which are incorporated herein by reference:

U.S. Pat. No. 6,151,424, Nov. 21, 2000, System for identifying objects and features in an image, Hus, Shin-yi, U.S. Pat. No. 5,351,302, Sep. 27, 1994, Method for authenticating objects identified by images or other identifying information, Leighton, Frank T., U.S. Pat. No. 5,214,350, May 25, 1993, Identification of image displays and their component parts, Remec, Thomas M., U.S. Pat. No. 4,300,160, Nov. 10, 1981, Thermal imaging device for detecting and identifying a thermal object, Pusch.

Figure 3:
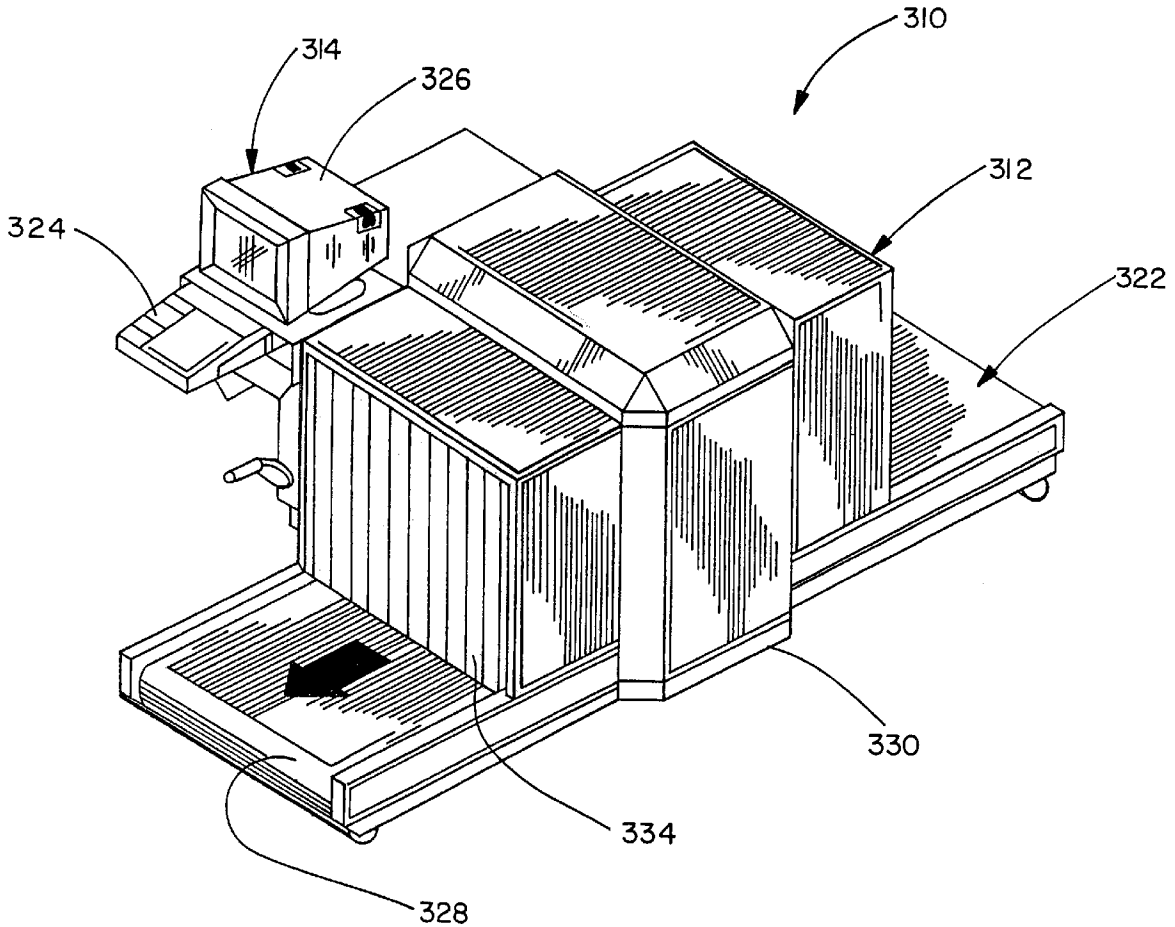
FIG. 3 is an image identifier system used in the present invention.

The next step of the process of FIG. 2 includes scanning the baggage 202 with the system of FIG. 3. This enables image process identification 203 to be implemented so that an alarm may be activated 204 when weapons or contraband are identified.

Referring to FIG. 3, the inspection system 310 of the present invention includes scanner system 312, an operator console 314 and a controller 316 which controls the operation of the scanner system and the operator console. The scanner system 312 utilizes an x-ray source 318, a radiation detector 320, and a conveyor system 322 to transport an article to a position between the x-ray source and radiation detector and scan the article. The operator console 314 includes an operator input device 324 and a display device 326. The conveyor system 322 has a conveyor belt 328 and associated belt drive mechanisms (e.g., a power roller not shown) that move the article through the x-ray beam.

Typically, the x-ray source 318 and the radiation detector 320 are enclosed in a common housing 330, seen in FIG. 3, and the conveyor belt 328 of the conveyor system 322 passes through a tunnel 332 in the housing 330 to move the article being inspected through a fan-shaped beam, or into position for scanning by a movable pencil shaped beam. Entrance and exit ends of the tunnel are blocked by lead curtains 334 to limit x-ray scatter. The tunnel 332 also includes a pair of article detector assemblies, e.g., photocells 336 which detect when an article enters the tunnel and when the article exits the tunnel. Indications from these article detector assemblies are transferred to the controller 316 and subsequently displayed on the display device 326 of the operator console so that the operator has an indication when the article enters and exits the tunnel. Thereafter, the operator can change the operation (or movement) of the conveyor belt 328 using control switches on the operator console.

In the embodiment of FIG. 3, the controller 316 is included in the scanner system 312, and the operator console 314 operates with the image identifying database to sound an alarm when weapons or contraband are identified.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An automated security scanning process comprising the steps of:

creating a database of computerized image characteristics of known weapons and contraband;

scanning baggage to obtain image characteristics of elements in baggage;

identifying known weapons and contraband when characteristics of contents in the baggage match image characteristics of known weapons and contraband; and activating an alarm when known weapons and contraband.

2. An automated security scanning process, as defined in claim 1, wherein said scanning step is accomplished using an x-ray luggage scanning system.

* * * * *